United States Patent
Anfriani et al.

(10) Patent No.: US 11,243,525 B2
(45) Date of Patent: Feb. 8, 2022

(54) FORECASTING MAINTENANCE OPERATIONS TO BE APPLIED TO AN ENGINE

(71) Applicant: SAFRAN AIRCRAFT ENGINES, Paris (FR)

(72) Inventors: Alexandre Anfriani, Alfortville (FR); Julien Alexis Louis Ricordeau, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 536 days.

(21) Appl. No.: 15/102,455

(22) PCT Filed: Dec. 3, 2014

(86) PCT No.: PCT/FR2014/053148
§ 371 (c)(1),
(2) Date: Jun. 7, 2016

(87) PCT Pub. No.: WO2015/086957
PCT Pub. Date: Jun. 18, 2015

(65) Prior Publication Data
US 2016/0313728 A1   Oct. 27, 2016

(30) Foreign Application Priority Data
Dec. 13, 2013   (FR) ...................... 13 62549

(51) Int. Cl.
*G05B 23/02*      (2006.01)
*G06Q 10/00*    (2012.01)

(52) U.S. Cl.
CPC ......... *G05B 23/0283* (2013.01); *G06Q 10/20* (2013.01)

(58) Field of Classification Search
None
See application file for complete search history.

(56) References Cited

U.S. PATENT DOCUMENTS

| | | | | |
|---|---|---|---|---|
| 4,926,362 A | * | 5/1990 | Carns | G06F 17/5009 703/6 |
| 6,226,597 B1 | * | 5/2001 | Eastman | G06Q 10/06 702/34 |

(Continued)

FOREIGN PATENT DOCUMENTS

WO        2013/182823 A1    12/2013

OTHER PUBLICATIONS

M. Naeem, "Impacts of low-pressure (LP) compressors' fouling of a turbofan upon operational-effectiveness of a military aircraft," Applied Energy, 2008, vol. 85, No. 4, pp. 243-270, XP022406374.

(Continued)

*Primary Examiner* — Jan P Mincarelli
(74) *Attorney, Agent, or Firm* — Oblon, McClelland, Maier & Neustadt, L.L.P.

(57) ABSTRACT

There is provided a method of and system for forecasting maintenance operations to be applied to an aircraft engine including a plurality of components monitored by damage counters, each damage counter being limited by a corresponding damage ceiling, the method including simulating consumption of the damage counters by iteratively drawing a series of simulation missions from a learning database; for each iteration, determining an accumulated consumption of each of the damage counters, until at least one damage counter related to a current simulation mission reaches a predetermined value limited by the damage ceiling associated with the damage counter; and applying a maintenance strategy on the current simulation mission to determine maintenance indicators representative of maintenance operations to be planned on the aircraft engine.

11 Claims, 6 Drawing Sheets

(56) References Cited

U.S. PATENT DOCUMENTS

| | | | | |
|---|---|---|---|---|
| 6,408,258 B1* | 6/2002 | Richer | G06Q 10/06 | 702/182 |
| 6,968,293 B2* | 11/2005 | Wiegand | G06Q 10/06 | 702/184 |
| 7,283,932 B2* | 10/2007 | Olsson | G01M 13/021 | 702/182 |
| 7,627,459 B2* | 12/2009 | Volovoi | G06F 17/5013 | 703/13 |
| 8,073,653 B2* | 12/2011 | Suzuki | G07C 3/00 | 702/181 |
| 8,340,948 B1* | 12/2012 | Song | G06Q 10/20 | 703/6 |
| 8,560,368 B1* | 10/2013 | Maity | G06Q 10/0631 | 705/7.13 |
| 8,781,982 B1* | 7/2014 | Das | G06E 1/00 | 706/21 |
| 2003/0078708 A1* | 4/2003 | Harper | G06Q 10/06 | 701/31.4 |
| 2005/0004821 A1* | 1/2005 | Garrow | G06Q 10/06 | 705/7.11 |
| 2006/0190280 A1* | 8/2006 | Hoebel | G06Q 10/06 | 705/330 |
| 2007/0118502 A1* | 5/2007 | Aragones | G06Q 10/06 | |
| 2007/0124189 A1* | 5/2007 | Stoughton | G06Q 10/06 | 705/7.11 |
| 2008/0082229 A1* | 4/2008 | Wingenter | G01M 17/00 | 701/34.4 |
| 2008/0125933 A1* | 5/2008 | Williams | G06Q 10/0637 | 701/29.5 |
| 2008/0172268 A1* | 7/2008 | Wingenter | G06Q 10/06 | 705/305 |
| 2008/0319629 A1* | 12/2008 | Iraudo | B64D 43/00 | 701/100 |
| 2009/0228409 A1* | 9/2009 | Eklund | G06F 11/008 | 706/12 |
| 2009/0229272 A1* | 9/2009 | Feeney | F01D 19/00 | 60/778 |
| 2010/0017241 A1* | 1/2010 | Lienhardt | G06Q 10/00 | 705/7.12 |
| 2010/0023209 A1* | 1/2010 | Maisonneuve | G06Q 10/06 | 701/33.4 |
| 2010/0049379 A1* | 2/2010 | Vial | G07C 5/0808 | 701/3 |
| 2010/0063933 A1* | 3/2010 | Djeridi | G06Q 10/06 | 705/301 |
| 2010/0070237 A1* | 3/2010 | Yitbarek | G06Q 10/06 | 702/177 |
| 2010/0082267 A1* | 4/2010 | Schimert | G05B 19/4065 | 702/34 |
| 2010/0250448 A1* | 9/2010 | Towe | G06Q 10/06 | 705/302 |
| 2010/0262442 A1* | 10/2010 | Wingenter | G06Q 10/04 | 705/7.38 |
| 2011/0112878 A1* | 5/2011 | Isom | G06Q 10/06311 | 705/7.13 |
| 2011/0166798 A1* | 7/2011 | Knodel | F01D 21/003 | 702/34 |
| 2011/0245999 A1* | 10/2011 | Kordonowy | G07C 5/0816 | 701/3 |
| 2012/0008793 A1* | 1/2012 | Knox | H04R 1/10 | 381/74 |
| 2012/0166249 A1* | 6/2012 | Jackson | G05B 19/41865 | 705/7.28 |
| 2012/0179326 A1 | 7/2012 | Ghelam | | |
| 2012/0221193 A1* | 8/2012 | Delaye | G05B 23/0283 | 701/31.9 |
| 2012/0253870 A1* | 10/2012 | Tsuru | G06Q 10/06 | 705/7.12 |
| 2013/0198556 A1* | 8/2013 | Kolbet | G06Q 10/20 | 714/2 |
| 2013/0268501 A1* | 10/2013 | Gorinevsky | G06Q 10/20 | 707/693 |
| 2013/0325286 A1* | 12/2013 | Lacaille | G05B 23/0221 | 701/99 |
| 2014/0052501 A1* | 2/2014 | Dickson | G06Q 10/0631 | 705/7.37 |
| 2014/0089029 A1* | 3/2014 | Belur | G06Q 10/1097 | 705/7.21 |
| 2014/0244328 A1* | 8/2014 | Zhou | G06Q 10/20 | 705/7.13 |
| 2015/0186568 A1 | 7/2015 | Anfriani et al. | | |
| 2016/0005242 A1* | 1/2016 | Hua | G06Q 10/00 | 701/29.3 |
| 2017/0144778 A1* | 5/2017 | Brookhart | B64D 45/00 | |
| 2017/0183107 A1* | 6/2017 | Brookhart | G06Q 10/08 | |

OTHER PUBLICATIONS

E. Hugues, et al., "Methods to assess the operational reliability of an aircraft system: problem of dependency between component states," LAAS Report, Jun. 2006, 16 pages, XP008083016.

M. Naeem, et al., "Implications of a Military Turbofan's High-Pressure Turbine Erosion for Blade's Creep-Life Consumption," Journal of Propulsion and Power, vol. 26, No. 1, Jan.-Feb. 2010, pp. 177-182, XP055147177.

International Search Report dated Apr. 21, 2016 in PCT/FR2014/053148 Filed Dec. 3, 2014.

French Search Report dated Oct. 16, 2014 in FR 13 62549 Filed Dec. 13, 2013.

* cited by examiner

|     | C1  | C2  | ······· | Cm  |
| --- | --- | --- | ------- | --- |
| M1  | ... | ... |         | ... |
| M2  | ... | ... |         | ... |
| ⋮   |     |     |         |     |
| Mn  | ... | ... | ······· | ... |

FIG. 4A

| A1 | B1 | E1 | C1 | S1 | I1 | OP1 |
| --- | --- | --- | --- | --- | --- | --- |
|    |    | E2 | C2 | S2 |    | OP2 |
|    | B2 | E3 | C3 | S3 | I3 | OP3 |
|    |    | E4 | C4 | S4 |    | OP4 |
|    | B3 | E5 | C5 | S5 |    | OP5 |
| ⋮  | ⋮  |    | Ci | Si |    |     |
| An |    |    | Cm | Sm | Im | OPm |

FORECASTING MAINTENANCE OPERATIONS TO BE APPLIED TO AN ENGINE

FIELD OF THE INVENTION

This invention relates to the field of maintenance of an aircraft engine. In particular, the invention relates to a method and system for forecasting maintenance operations to be applied to an aircraft engine.

Forecasting of maintenance operations on an aircraft engine is determined as a function of the estimated damage or wear of the different elements of the engine.

However, the use of an aircraft engine under conditions that can vary from one flight mission to another, for example as in the case of a warplane, makes it impossible to forecast damage to the engine directly. In this case, the estimate is based on damage counters calculated for each mission from records of flight parameters.

An aircraft engine is composed of several modules each comprising different components. Each component may comprise several zones or elements to be monitored, which are controlling in terms of component life. We will simply talk about components for the remaining description, for simplification reasons. A damage counter is associated with each component to count the number of real cycles consumed by the component. Each damage counter is also associated with at least one damage ceiling. Different maintenance actions can be done when one or more ceilings are reached. These maintenance actions are described in a maintenance plan and vary from an inspection without removal, to replacement of damaged parts and including inspections requiring removals. The purpose of maintenance managing operations is to perform just-in-time maintenance operations to extend the use of parts or components to their maximum operating potential.

However, consumptions of damage counters and the rate of these consumptions vary strongly from one mission to another, particularly depending on the mission type. Therefore, damage counters can reach their ceilings at different rates and therefore in different flights. Maintenance defined from damage counters can then require fairly frequent removals. The fact that damage counters can reach their ceilings at different times often results in frequent removals. These different removals can thus affect the availability of aircraft on their bases.

Consequently, the purpose of this invention is to optimise maintenance operations on aircraft engines in order to improve the availability of aircraft while respecting all safety requirements and constraints.

PURPOSE AND SUMMARY OF THE INVENTION

This invention relates to a method of forecasting maintenance operations to be applied to an aircraft engine or part of an aircraft engine comprising a plurality of components monitored by damage counters, each damage counter being limited by a corresponding damage ceiling, said method comprising the following steps:
  simulate consumption of said damage counters, iteratively drawing a series of simulation missions from a learning database;
  for each iteration, determine an accumulated consumption of each of said damage counters, until at least one damage counter related to a current simulation mission reaches a predetermined value limited by the damage ceiling associated with said damage counter;
  apply a maintenance strategy on said current simulation mission to determine maintenance indicators representative of maintenance operations to be planned on the aircraft engine.

Simulating consumption of sensors by making a simple draw of a sequence of missions can give a forecast of the number and type of maintenance actions depending on the implemented maintenance strategy defined by the predetermined values associated with the damage ceilings. This simulation principle enables very high flexibility for calculation steps, at low cost and without requiring any particular knowledge of statistics.

Advantageously, the method includes the following steps:
  apply a series of different maintenance strategies comprising determination of cost and availability indicators associated with the current strategy for each application of a current strategy, and determination of a compromise indicator as a function of said cost and availability indicators; and
  compare compromise indicators for the different strategies to select an optimum maintenance strategy.

This makes it possible to make good use of maintenance strategies by taking account of the variability of damage counters and finding the best strategies to be applied efficiently.

According to a first embodiment, application of a maintenance strategy includes the following steps:
  estimate the cumulated consumption of each damage counter up to a determined number of flights; and
  group maintenance operations associated with damage counters reaching their damage ceilings.

Grouping of maintenance operations provides a means of improving engine availability. For example, a 2000 flights horizon can be simulated while grouping maintenance operations by anticipating actions that would be triggered within the next 50 or 100 flights.

According to a second embodiment, application of a maintenance strategy includes the following steps:
  compare the consumption of damage counters of said current simulation mission with intermediate thresholds or ceilings below damage ceilings, and
  group maintenance operations associated with damage counters reaching said intermediate ceilings.

Advantageously, the method comprises the following steps:
  repeat the simulated consumption of damage counters a plurality of times to determine a set of consumption values associated with each maintenance indicator, and
  calculate an average of said consumption values associated with each maintenance indicator.

This provides a means of forecasting maintenance operations more realistically and obtaining statistical information.

The learning database includes:
  a set of experience missions and consumption of potential sensors associated with each of said experience missions, and
  a predetermined maintenance plan comprising damage ceilings associated with potential sensors and corresponding maintenance actions.

Advantageously, the learning database also includes mission indicators including a severity indicator for each mission, a flight duration indicator for each mission, and a mission type indicator.

This can enrich the database and classify missions as a function of the severity, type or duration. Missions are thus classified in a relevant manner to make random draw more realistic.

Advantageously, said series of simulation missions is drawn at random from a subset of experience missions belonging to a specific type of mission.

As a result, the simulation can be made specific to an aircraft base, a fleet or specific mission types. Thus, the maintenance plan can be adapted to the manner in which aircrafts are used.

Advantageously, the method includes an update to the database.

This provides a means of having a database representative of future and adaptive missions depending on the customer.

The invention also covers a maintenance forecasting tool to be applied to a fleet of aircraft engines by applying the method of forecasting maintenance operations according to the above characteristics on each aircraft engine.

The invention also covers a system for forecasting maintenance operations to be applied to an aircraft engine comprising a plurality of components monitored by damage counters, each damage counter being limited by a corresponding damage ceiling, said system comprising:
    processing means adapted to simulate consumption of said damage counters by iteratively drawing a series of simulation missions from a learning database containing experience missions;
    processing means adapted to determine a cumulated consumption of each of said damage counters for each iteration until at least one damage counter related to a current simulation mission reaches a predetermined value limited by the damage ceiling associated with said damage counter,
    processing means adapted to apply a maintenance strategy on said current simulation mission to determine maintenance indicators representative of maintenance operations to be performed on the aircraft engine.

BRIEF DESCRIPTION OF THE DRAWINGS

Other specific features and advantages of the device and the method according to the invention will become clear after reading the description given below, provided for information but not limitative, with reference to the appended drawings on which.

DETAILED DESCRIPTION OF EMBODIMENTS

The general principle of the invention is to give a prognostic of the consumption of damage counters of an aircraft engine starting from a mission database and to use this prognostic to optimise application of a maintenance strategy aimed at optimising availability of the engine and maintenance costs of said engine.

Figure 1:
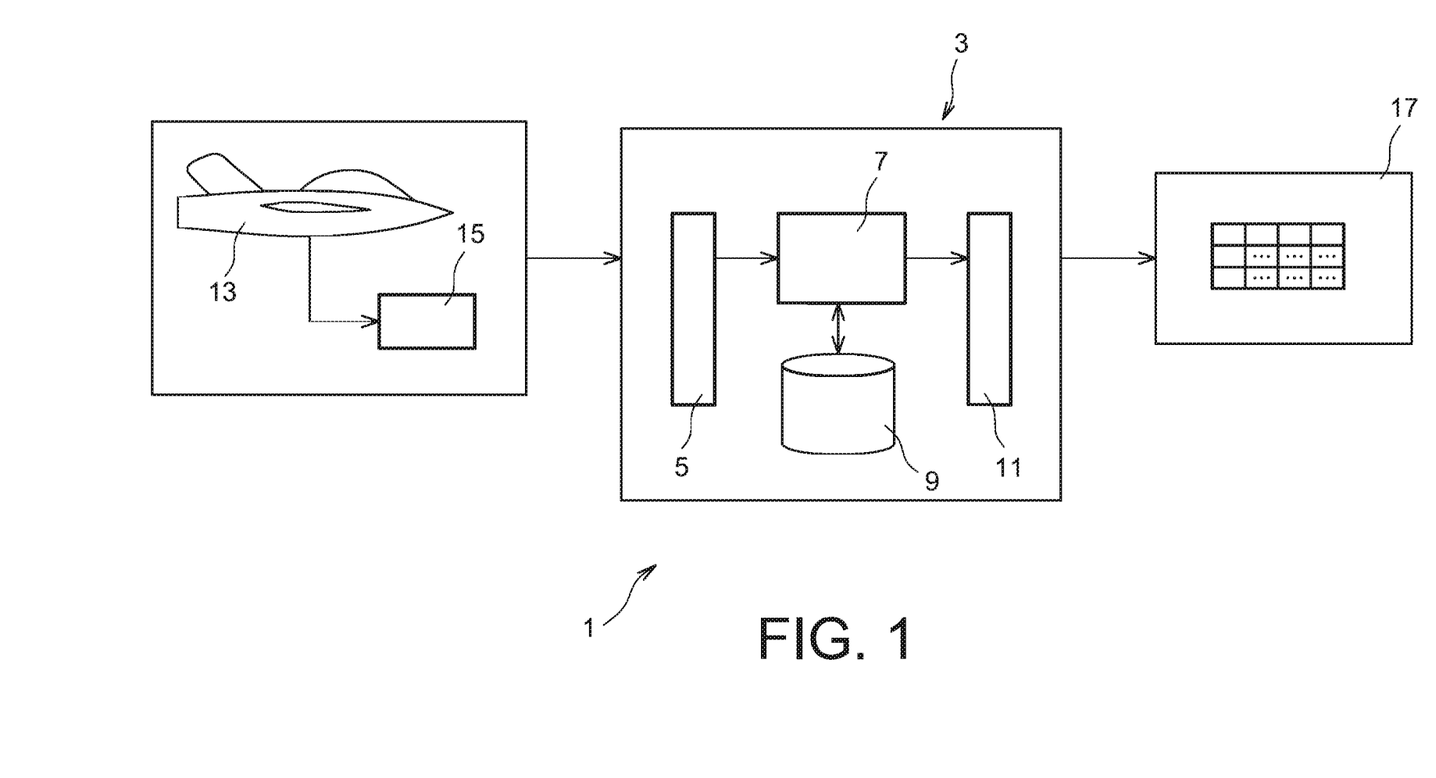
FIG. 1 diagrammatically illustrates a system for forecasting maintenance operations to be applied on an engine or a part of an engine according to the invention.

FIG. 1 diagrammatically illustrates a system for forecasting maintenance operations to be applied to an aircraft engine, according to the invention.

Advantageously, the forecasting system 1 is installed in aground station and comprises a computer system 3 usually comprising input means 5, processing means 7, storage means 9 and output means 11. It will be noted that the storage means 9 may include a computer program comprising code instructions adapted to implementation of the forecasting method according to the invention. This computer program may be run by processing means 7 related to the storage means 9 and input means 5 and output means 11.

For each flight mission, the aircraft 13 collects and records flight parameters on its onboard computers 15. These data may be downloaded regularly, for example after each mission, to be retrieved by the forecasting system 1. It will be noted that some of these data may be sent to the ground station in real time.

Data retrieved by the forecasting system 1 are used to determine consumption of damage counters 17 (i.e. to count real cycle numbers occurring on or consumed by the modules) to estimate wear or damage of the different modules in the aircraft engine.

Figure 2:
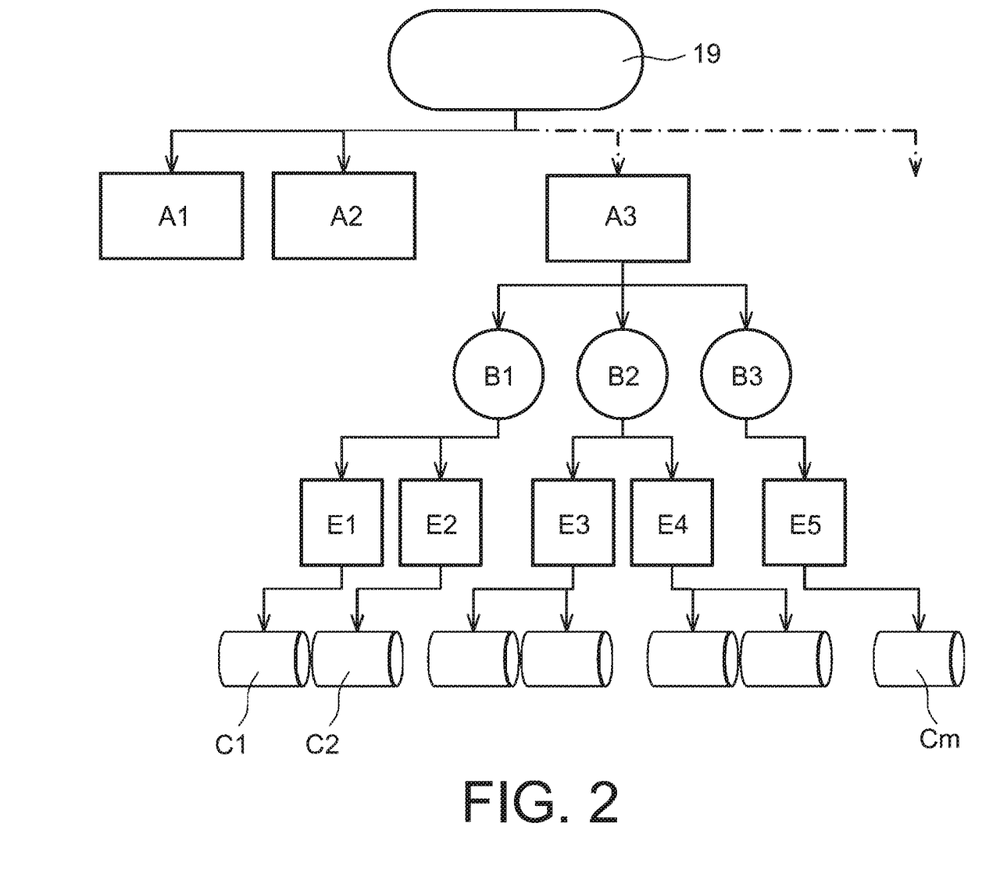
FIG. 2 diagrammatically illustrates a structure of damage counters for an aircraft engine.

FIG. 2 diagrammatically illustrates a structure of damage counters for an aircraft engine.

The aircraft engine 19 is composed of a set of modules A1, A2, A3 each comprising different components B1, B2, B3. Each component may comprise several zones or elements E1-E5 that can be used to size the component life. At least one damage counter C1-Cm is then associated with each element E1-E5 to count the real number of cycles consumed by this element. The consumption of each damage counter is limited by at least one damage ceiling characterising the life (before failure) of the component monitored by the damage counter.

Thus, when one or several damage ceilings are reached, maintenance actions described in a table or maintenance plan (see FIG. 4B) must be envisaged.

Figure 3:
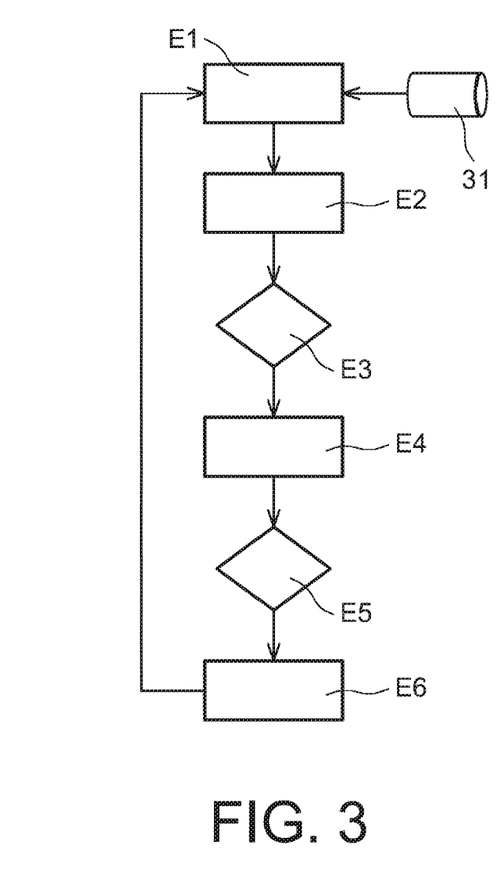
FIG. 3 is a flowchart diagrammatically illustrating a method of forecasting maintenance operations on an aircraft engine, according to the invention.

FIG. 3 is a flowchart diagrammatically illustrating a method of forecasting maintenance operations on an aircraft engine, according to the invention.

In step E1, the processing means 7 are adapted to simulate a consumption of damage counters C1-Cm by iteratively drawing a series of simulation missions from a learning database 31, for example contained in storage means 9. The learning database 31 contains a set of experience missions and a predetermined maintenance plan. The experience missions include data collected during real flights and provide operating feedback.

Figure 4A:
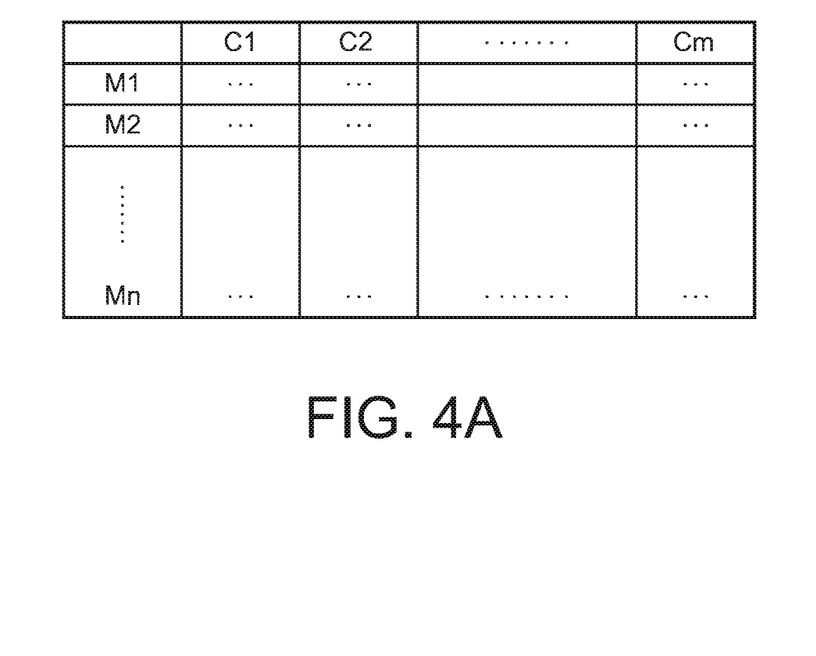
FIG. 4A diagrammatically illustrates a table containing all experience missions and associated potential sensors.

FIG. 4A diagrammatically illustrates a table containing a set of experience missions and the associated potential sensors.

The first column contains codes or numbers for the different missions M1-Mn. The other columns refer to the different damage counters C1-Cm associated with the different elements of the engine and give the consumption of each counter during each mission. The number of cycles or the consumption given by each counter may for example be a measurement of the wear or damage of the corresponding component of the engine.

Figure 4B:
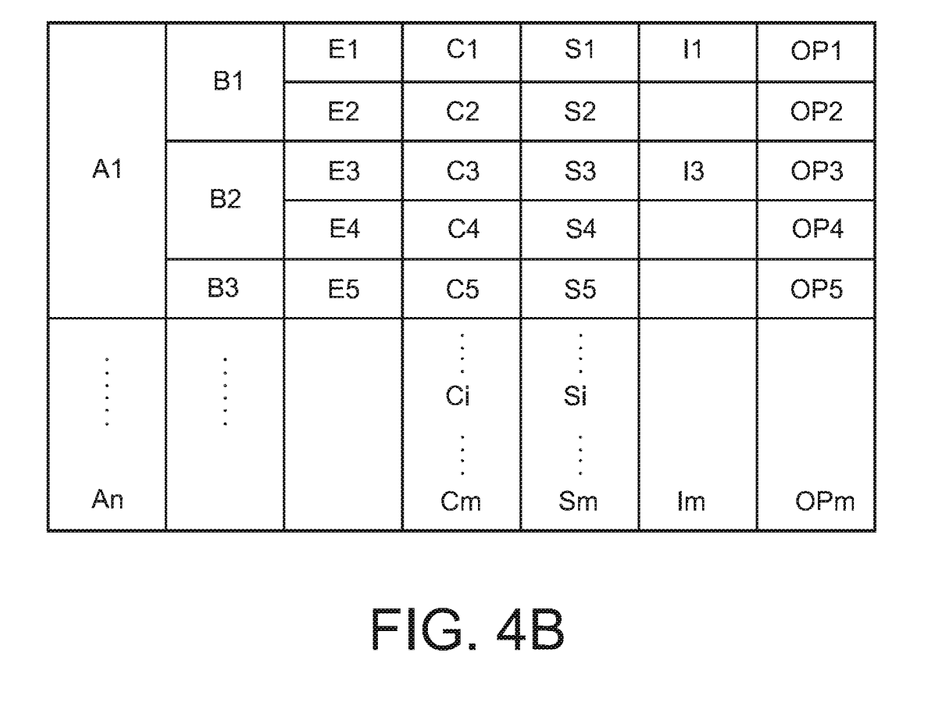
FIG. 4B diagrammatically illustrates a table describing a maintenance plan for an aircraft engine.

FIG. 4B diagrammatically illustrates a table describing a maintenance plan for an aircraft engine.

The first column refers to the set of modules A1-An of the engine. The different components B1-B3 of each module are given in the second column. The third column refers to the different locations or the different elements E1-E5 of each component. The fourth column relates to damage counters C1-Cm associated with the different elements in the engine. The fifth column refers to damage ceilings S1-Sm associated with the different damage counters C1-Cm and the sixth column possibly gives between-inspection intervals I1-Im for elements that may be inspected several times before being replaced. Finally, the seventh column describes the maintenance operation OP1-OPm to be performed on each element or component when the corresponding damage ceiling is reached.

Advantageously, the learning database 31 may be enriched by indicators defining the different missions. Each mission M1-Mn may for example be defined by a severity indicator, a flight duration indicator and a mission type indicator. The severity indicator represents the global damage during the mission. For example, the global damage may be a maximum value, an average value or a minimum value of the damage counters.

Step E1 thus simulates consumption of damage counters C1-Cm by successively simulating different missions starting from data derived from the past contained in the learning database 31. Each mission is drawn at random and the consumption of damage counters is deduced from the drawn mission.

According to a first variant, the draw is made completely at random without any indication about future missions so as to model aging of an engine or a fleet of engines.

According to a second variant, the simulation is made in an oriented way by filtering the learning database and drawing at random according to the selected filter. In this case, the simulation is typically specified by taking account of forecasting information for future missions (mission type, severity, flight time). For example, the series of simulation missions may be drawn at random from a subset of experience missions that can be selected as a function of mission severity indicators, and/or mission flight time and/or mission type.

In steps E2 and E3, the processing means 7 are adapted to determine the cumulated consumption of each damage counter C1-Cm for each iteration, until at least one damage counter for a current simulation mission reaches a predetermined value limited by the damage ceiling associated with the damage counter. Thus, the predetermined value is less than or equal to the corresponding damage ceiling. For example, the predetermined value is determined as a function of the number of missions and the value of the damage ceiling.

More particularly, for each current simulation mission derived from step E1, the processing means 7 calculate the cumulated consumption of each of the damage counters C1-Cm in step E2. Step E3 is a test to check whether or not there is at least one damage counter related to the current simulation mission that has already reached the predetermined value associated with the damage ceiling. If the result of the test is negative, step E1 is started again to draw a new current mission. On the other hand, if at least one damage counter has reached the predetermined value, then the following steps E4-E6, are performed.

In steps E4-E6, the processing means 7 are adapted to apply a maintenance strategy on the current simulation mission thus determining maintenance operations to be performed on the aircraft engine 19 and maintenance indicators representative of these operations.

In particular in step E4, the maintenance action corresponding to the damage ceiling $S_i$ reached by the damage counter $C_i$ is determined.

In step E5, it is checked if the maintenance strategy is applicable to the maintenance action in step E4. If it is, step E6 is performed and otherwise, step E1 is started again.

Finally, the maintenance strategy is applied in step E6 and the maintenance indicators are determined. Advantageously, these indicators include the number and types of removals.

This method can thus be used to forecast the number and type of maintenance actions as a function of the strategy implemented for a sequence of drawn missions.

Advantageously, the simulation of the consumption of damage counters is repeated a plurality of times to determine a set of consumption values associated with each maintenance indicator. Processing means 7 are also adapted to calculate the average of consumption values associated with each maintenance indicator. Thus, the repetition of steps in FIG. 2 a large number of times provides a means of precisely estimating average values of maintenance indicators and also drawing statistical information from these values, for example using the Monte Carlo method.

Figure 5:
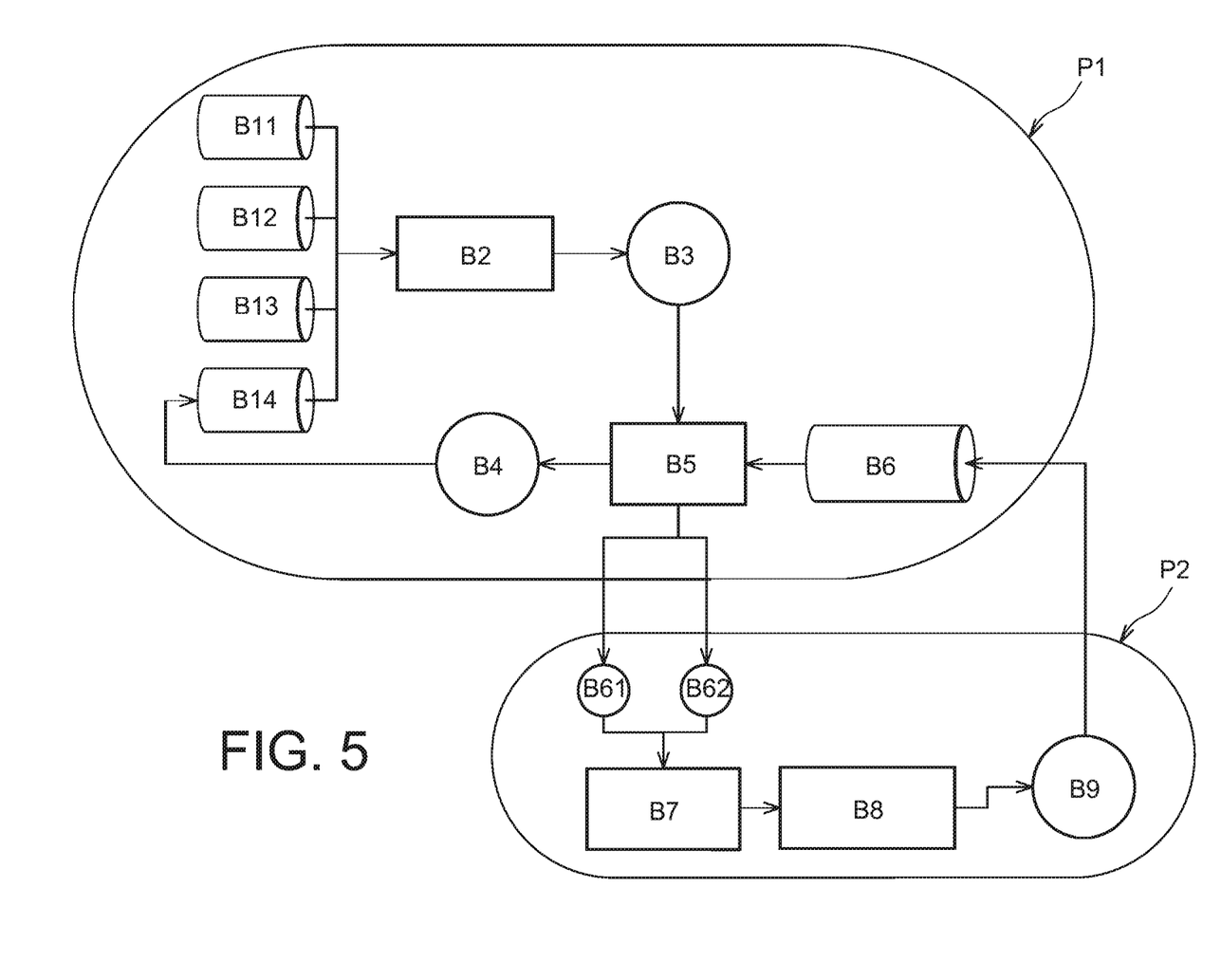
FIG. 5 is a block diagram illustrating the method of forecasting maintenance operations, according to a preferred embodiment of the invention.

FIG. 5 is a block diagram illustrating the method of forecasting maintenance operations, according to one preferred embodiment of the invention. This method is advantageously made using the forecasting system in FIG. 1.

This diagram includes a first part P1 concerning simulation of a maintenance plan and a second part P2 concerning optimisation of maintenance strategies.

In the first part P1, blocks $B_{11}$, $B_{12}$, $B_{13}$ and $B_{14}$ are input data used to predict consumption of damage counters C1-Cm and may be derived from the past and possibly filtered as a function of planned future missions. Data derived from the past can be used to complete the learning database 31. Forecasting data can be used to refine predictions by providing information about mission types, durations and severities, thus refining use of the learning database 31.

More particularly, block $B_{11}$ relates to severity data that are used to classify missions M1-Mn as a function of their severity in terms of consumption of damage counters C1-Cm. They may be previous data and may be chosen as a function of the distribution of missions depending for example on the profile type of the fleet.

Block $B_{12}$ relates to the duration of missions M1-Mn. This is the flight time of each mission or it may possibly be detailed information such as the take off time, time spent idling, etc.

Block $B_{13}$ relates to data for sorting missions M1-Mn as a function of their type. These data correspond to the descriptions of aircraft missions for example such as a "training" or "interception" or "refuelling" type mission, etc. They may be previous data or forecasts for future missions.

Block $B_{14}$ relates to the current state of damage counters C1-Cm. These are current and previous consumptions for each damage counter on the same engine.

Block $B_2$ is a consumption simulator of potential sensors C1-Cm implemented by the processing means 7. As input, the consumption simulator $B_2$ has data $B_{11}$, $B_{12}$, $B_{13}$ and $B_{14}$ corresponding to a list of missions for which the mission severity, duration, and type and the current state of counters C1-Cm are known. The consumption simulator $B_2$ makes a random draw in the learning database 31 to draw missions that coincide with or are the most similar to the input data. Thus, a series of missions is drawn from a subset of experience missions belonging to a specific mission class. For example, the consumption simulator $B_2$ uses filters to draw missions belonging to a certain mission severity and/or a certain mission type and/or around a certain duration.

Block $B_3$ represents output data from the consumption simulator $B_2$ comprising the forecast consumption of damage counters C1-Cm for each flight. Thus, the cumulated consumption for each damage counter is available after each mission.

Block $B_4$ is a maintenance simulator used by the processing means 7, that compares cumulated consumptions of damage counters C1-Cm with predetermined values associated with damage ceilings S1-Sm defined in the maintenance plan (FIG. 4B). If none of the damage counters has reached the predetermined value associated with it, then the current state of the counters (block $B_{14}$) is updated by update data (block $B_5$) taking account of aging of components, and steps to simulate consumption of damage counters are then restarted.

On the other hand, when at least one of the damage counters has reached the predetermined value, a maintenance strategy (block $B_6$) is applied. For example, the engine availability can be improved by applying an anticipation strategy over a determined<<50 flight anticipation>>type time horizon to estimate the values of the damage counters in 50 flights. Consumption simulation steps are then performed again over the determined horizon and if other damage counters reach predetermined values associated with them, then the associated maintenance actions can be grouped together and the number and types of removals can be determined.

Advantageously, simulation over the determined horizon is made a large number of times (for example, several tens of thousands of times) in order to estimate the average of maintenance indicators (number and types of removals) with high precision.

At the end of the first part P1 (maintenance simulation), optimisation indicators are obtained in addition to maintenance indicators. Optimisation indicators include particularly two indicators, namely availability (block $B_{61}$) of the module or the engine and the cost (block $B_{62}$) associated with maintenance. These optimisation indicators can be used by the second part P2 of the block diagram to find the best maintenance strategies to be applied.

The cost indicator is a single output or multi-output function that depends on the associated maintenance strategy, and that includes consumption of parts P and the cost of removal C. For example a cost function J weighted by predetermined weights $w_1$ and $w_2$ can have the following formula:

$$J = w_1 \cdot P + w_2 \cdot C$$

Furthermore, the availability indicator is a function that can be defined as the ratio of the operating time of a module (or engine) to the number of removals. Advantageously, the availability indicator can be considered as the actual operating time divided by the sum of actual operating times and the operating time that could have been consumed over the time period during which the module is in maintenance.

In block $B_7$, the processing means 7 are configured to determine a compromise indicator between cost and availability. The compromise indicator can be defined as a function of cost and availability desirability parameters.

For example, an individual cost or availability desirability $d^{DS}$ (symbolised by Y) can be defined for each determined objective or target T as follows:

$$d^{DS}(Y) = \begin{cases} 0 & \text{for } Y < LSL \\ \left(\dfrac{Y - LSL}{T - LSL}\right)^{\beta_1} & \text{for } LSL \leq Y \leq T \\ \left(\dfrac{USL - Y}{USL - T}\right)^{\beta_2} & \text{for } T < Y \leq USL \\ 0 & \text{for } USL < Y \end{cases}$$

where LSL is a lower specification limit, USL is an upper specification limit and $\beta_1$, $\beta_2$ are predetermined parameters that depend on the application. It will be noted that a desirability equal to 0 represents an unacceptable solution considering objectives, while a desirability equal to 1 indicates the maximum required performance.

Advantageously, cost and availability indicators are combined by defining a global desirability D as a function of an individual cost desirability $d_c^{DS}$ and an individual availability desirability $d_d^{DS}$ as follows:

$$D = \sqrt{d_c^{DS} \times d_d^{DS}}$$

The global desirability D is used to obtain a conventional optimisation of a single objective.

In block $B_8$, the processing means 7 are configured to implement an optimisation algorithm with single or multiple outputs.

In general, a genetic algorithm is used with selection, mixing and mutation steps. Advantageously, local optimisation of individuals can be added by a simulated annealing, particularly for optimisation of strategy parameters.

In block $B_9$, the processing means 7 are configured to select a new maintenance strategy among a predetermined set of strategies.

For example, the predetermined set of maintenance strategies includes a strategy with a determined horizon and a strategy with intermediate ceilings.

A strategy with a determined horizon consists of estimating the cumulated consumption of all other damage counters up to a predetermined number of flights, at the time of a planned removal related to one damage counter. Maintenance operations associated with damage counters reaching their predetermined values, for example equal to damage ceilings, are then grouped together.

An intermediate ceilings strategy consists of choosing predetermined values (called intermediate ceilings) lower than values of damage ceilings. Thus, when a planned removal relates to a damage counter of a current simulation mission, the consumption of other damage counters in the current simulation mission is compared with corresponding intermediate ceilings. Maintenance operations associated with damage counters reaching intermediate ceilings are then grouped together. An intermediate ceiling of a damage counter can be defined as a given percentage of the damage ceiling associated with the counter.

Therefore, maintenance strategies are rules for good practice defined by a structure and determined parameters. The purpose of optimisation is to search for the best strategies or combinations of strategies associated with these parameters.

Each new strategy can be tested by looping back onto block $B_6$ so that it is applied by the maintenance simulator (block $B_4$) and optimisation steps are then restarted.

A sequence of different maintenance strategies is thus applied. Cost and availability indicators associated with the current strategy are determined for each application. The next step is to determine a compromise indicator as a function of these cost and availability indicators. The compromise indicators for the different strategies are compared with each other to select an optimum maintenance strategy.

Advantageously, the learning database is updated to adapt to normal and/or future missions of a specific fleet of aircraft engines. Thus, experience missions initially recorded in the database can be replaced by data representative of missions performed for each group of aircraft.

FIGS. 6A-6D diagrammatically illustrate two application examples of the method according to this invention. In each of the two examples, a cumulated consumption of a set of modules for a new engine is simulated for a forecasting horizon of 1400 flights. All damage counters are equal to zero at the starting time. Furthermore, simulation on the selected horizon is made at least 1000 times in order to refine the precision of the results.

Figure 6A:
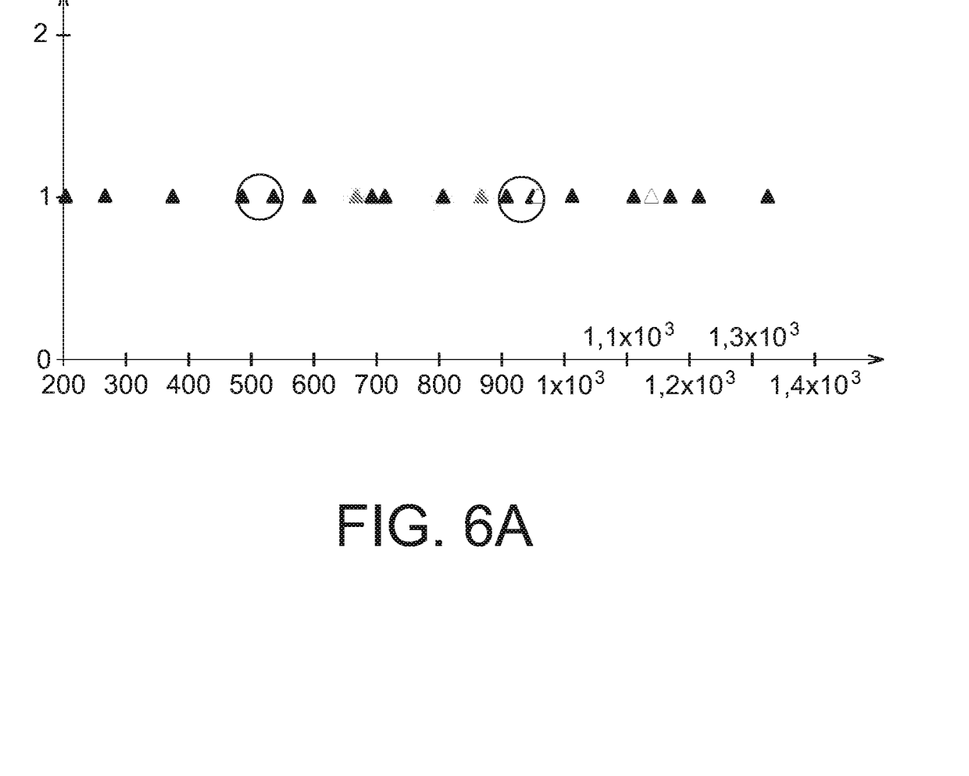
FIGS. 6A-6D diagrammatically illustrate two example applications of the method according to this invention.
Figure 6B:
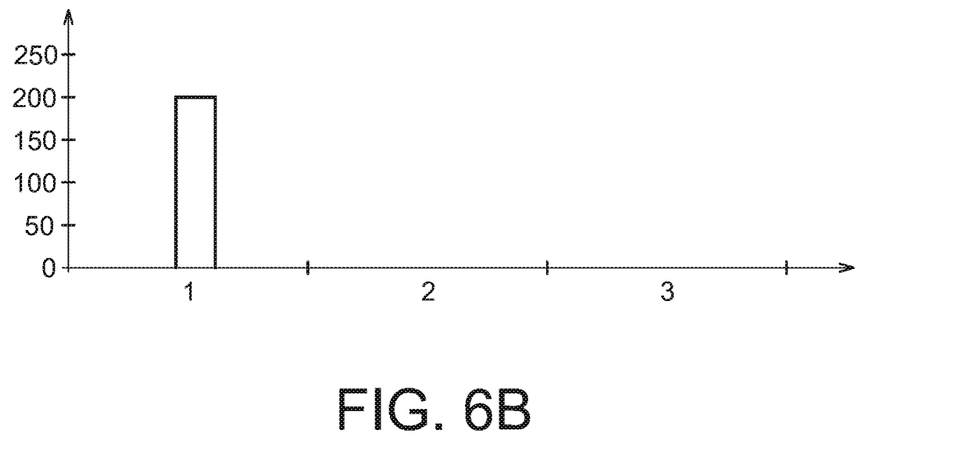

More particularly, FIGS. 6A-6B illustrate a first scenario in which maintenance operations are performed individually as they are triggered. FIG. 6A illustrates the distribution of maintenance operations identified by the corresponding damage counters. It will be noted that the time between removals can sometimes be very short. Furthermore, FIG. 6B illustrates the distribution of the number of inspections per removal and gives 200 individual removals.

Figure 6C:
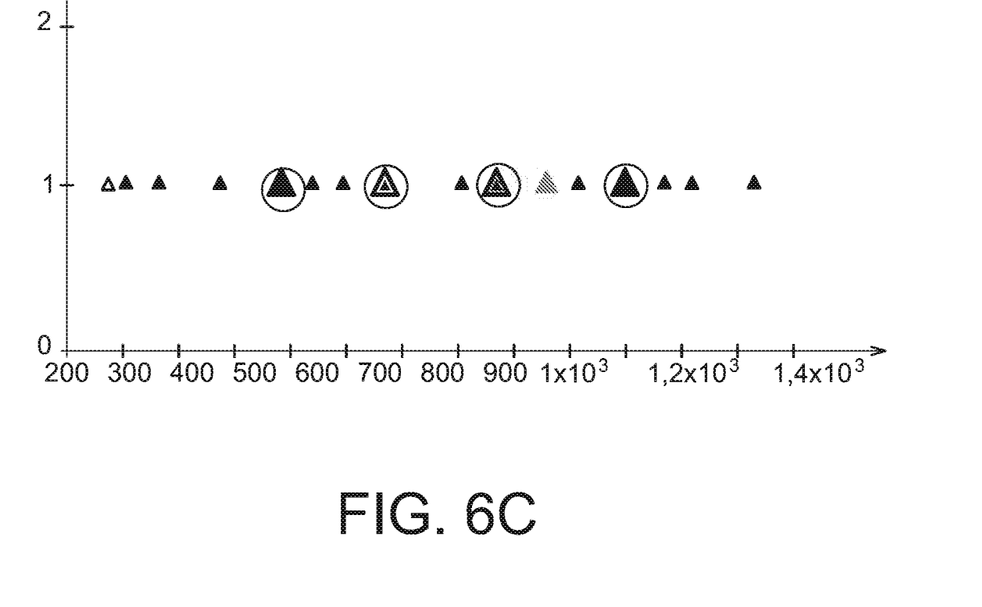
Figure 6D:
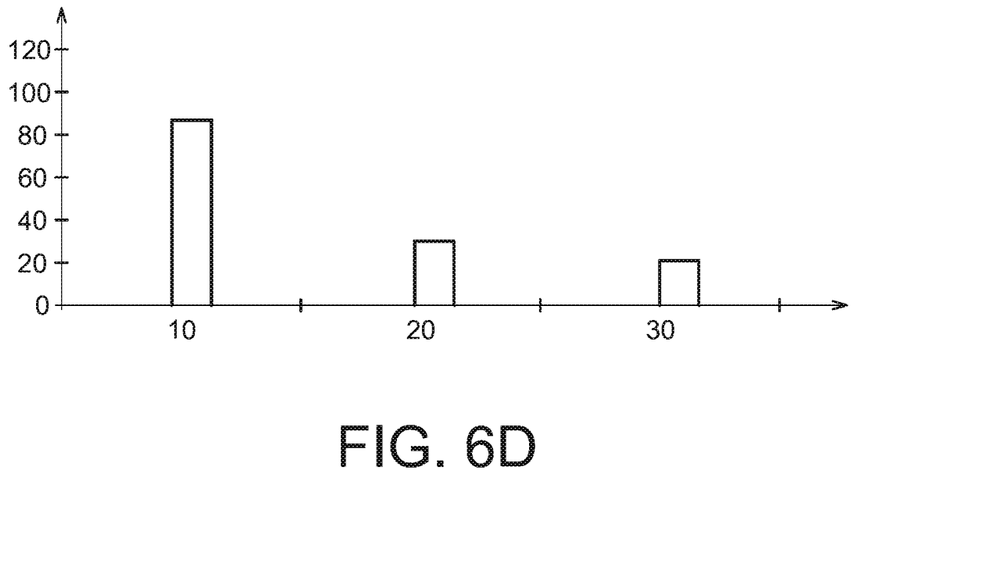

FIGS. 6C-6D illustrate a second scenario in which maintenance operations with short intervals are grouped together. Thus, when a maintenance action has to be triggered, all actions that would have been triggered within the next 50 flights are anticipated. FIG. 6D illustrates a distribution of 140 removals including 50 removals that group several maintenance operations, which makes aircraft availability better than in the first scenario.

Finally, it will be noted that this invention is a tool for a priori implementation of maintenance strategies or implementation depending on the current state of an engine or a fleet of engines. In other words, this tool can be used to choose the best strategies, either ignoring the current state of the fleet (i.e. in a priori), or taking account of the current state of the fleet in real time.

The invention claimed is:

1. A method of forecasting maintenance operations to be applied to an aircraft engine comprising a plurality of components monitored by damage counters, each damage counter being limited by a corresponding damage ceiling, the method comprising:
    simulating consumption of said damage counters by iteratively drawing a series of simulation missions from a learning database;
    determining, for each drawn simulation mission from the learning database corresponding to an iteration of the simulating, an accumulated consumption of each of said damage counters corresponding to the plurality of components, until at least one damage counter related to a current simulation mission reaches a predetermined value limited by the damage ceiling associated with said damage counter;
    associating the accumulated consumption of each of the damage counters corresponding to the plurality of components of the current simulation mission with a maintenance indicator representative of one or more maintenance operations directed to the at least one damage counter that reached the predetermined value in the current simulation mission;
    performing the simulating, the determining, and the associating a plurality of times and calculating an average of the accumulated consumption of each of the damage counters corresponding to the plurality of components associated with each maintenance indicator;
    for each of different maintenance strategies based on the average accumulated consumption of each of the damage counters associated with each maintenance indicator, determining cost and availability indicators, and determining a compromise indicator as a function of said cost and availability indicators; and
    comparing compromise indicators for the different maintenance strategies to select an optimum maintenance strategy.

2. The method according to claim 1, further comprising defining at least one of the different maintenance strategies by
    estimating the accumulated consumption of each damage counter up to a determined number of flights; and
    grouping maintenance operations associated with damage counters reaching their damage ceilings.

3. The method according to claim 1, further comprising defining at least one of the different maintenance strategies by comparing the accumulated consumption of the damage counters of said current simulation mission with intermediate thresholds below damage ceilings; and
    grouping maintenance operations associated with damage counters reaching said intermediate thresholds.

4. The method according to claim 1, wherein the learning database includes:
    a set of experience missions and consumption of one or more of the damage counters associated with each of said experience missions, and
    a predetermined maintenance plan comprising damage ceilings associated with each of the damage counters and corresponding maintenance actions.

5. The method according to claim 4, wherein the learning database also includes mission indicators including a severity indicator for each mission, a flight duration indicator for each mission, and a mission type indicator.

6. The method according to claim 4, wherein said series of simulation missions is drawn at random from a subset of the set of experience missions.

7. The method according to claim 1, further comprising updating the learning database.

8. A maintenance forecasting computer system for application to a fleet of aircraft engines by applying the method according to claim 1.

9. A system for forecasting maintenance operations to be applied to an aircraft engine comprising a plurality of components monitored by damage counters, each damage counter being limited by a corresponding damage ceiling, said system comprising:
    circuitry configured to
        simulate consumption of said damage counters by iteratively drawing a series of simulation missions from a learning database containing experience missions;
        determine, for each drawn simulation mission from the learning database corresponding to an iteration of the simulating, an accumulated consumption of each of said damage counters corresponding to the plurality of components until at least one damage counter related to a current simulation mission reaches a predetermined value limited by the damage ceiling associated with said damage counter;
        associate the accumulated consumption of each of the damage counters corresponding to the plurality of components of the current simulation mission with a maintenance indicator representative of one or more maintenance operations directed to the at least one damage counter that reached the predetermined value in the current simulation mission;

perform the simulating, the determining, and the associating a plurality of times and calculating an average of the accumulated consumption of each of the damage counters corresponding to the plurality of components associated with each maintenance indicator;

for each of different maintenance strategies based on the average accumulated consumption of each of the damage counters associated with each maintenance indicator, determine cost and availability indicators and determine a compromise indicator as a function of said cost and availability indicators; and compare compromise indicators for the different maintenance strategies to select an optimum maintenance strategy.

10. The method according to claim 1, wherein the availability indicators are calculated as an actual operating time divided by a sum of the actual operating time and an operating time that could have been consumed over a time period during which a module of the aircraft engine is in maintenance.

11. The system according to claim 9, wherein the availability indicators are calculated as an actual operating time divided by a sum of the actual operating time and an operating time that could have been consumed over a time period during which a module of the aircraft engine is in maintenance.

\* \* \* \* \*

UNITED STATES PATENT AND TRADEMARK OFFICE
CERTIFICATE OF CORRECTION

PATENT NO. : 11,243,525 B2
APPLICATION NO. : 15/102455
DATED : February 8, 2022
INVENTOR(S) : Alexandre Anfriani et al.

It is certified that error appears in the above-identified patent and that said Letters Patent is hereby corrected as shown below:

In the Specification

In Column 4, Line 9, delete "aground" and insert -- a ground --, therefore.

Signed and Sealed this
Thirty-first Day of May, 2022

Katherine Kelly Vidal
Director of the United States Patent and Trademark Office